No. 763,707. PATENTED JUNE 28, 1904.
H. K. AUSTIN.
INFLATING PUMP.
APPLICATION FILED NOV. 21, 1903.
NO MODEL.

WITNESSES:
C. H. Walker.
Lewis Hodges.

INVENTOR
Henry K. Austin
BY
Wright, Brown & Quinby
Attorneys

No. 763,707. Patented June 28, 1904.

UNITED STATES PATENT OFFICE.

HENRY K. AUSTIN, OF READING, MASSACHUSETTS.

INFLATING-PUMP.

SPECIFICATION forming part of Letters Patent No 763,707, dated June 28, 1904.

Application filed November 21, 1903. Serial No. 182,071. (No model.)

*To all whom it may concern:*

Be it known that I, HENRY K. AUSTIN, of Reading, in the county of Middlesex and State of Massachusetts, have invented certain new and useful Improvements in Inflating-Pumps, of which the following is a specification.

This invention relates to pumps intended especially for inflating pneumatic tires of bicycle and other vehicle wheels; and it has for its chief object to provide a construction which will permit the quick application of the pump to the tire-valve, its quick removal therefrom, and a firm and air-tight engagement with the valve while the pump is in operation.

A further object is to provide a pump of this type in which all screw-thread attachments are dispensed with and which will fit any valve, is simple in construction and use, and is light and convenient to carry.

A further object of the invention is to provide a pump of this type having a rubber coupling fitted within an integral bent end of the pump-barrel, whereby a direct passage of air from the pump to the valve may be given without the employment of any rubber hose, thereby preventing loss of air.

To these ends the invention consists in the improvements substantially as hereinafter described and claimed.

Figure 1:
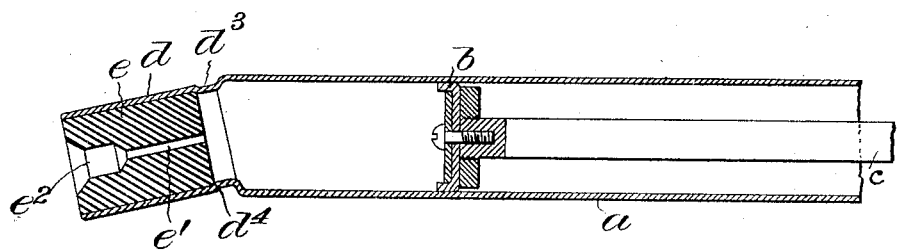
Figure 2:
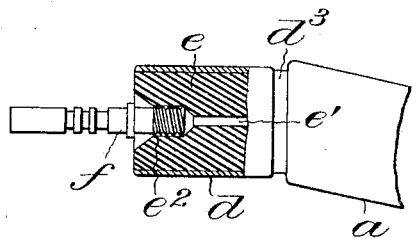

Of the accompanying drawings, forming a part of this specification, Figure 1 represents a longitudinal section of a portion of a pump embodying my invention. Fig. 2 represents a view similar to a portion of Fig. 1, showing the pump engaged with a tire-valve.

The same reference characters indicate the same parts in both figures.

In the drawings, $a$ represents a tubular pump-barrel containing a plunger comprising a piston $b$ and the rod $c$, which is affixed to and operates the piston.

$d$ represents a socket integral with the barrel $a$ and constituting an extension of the outer end thereof, the said socket communicating with the interior of the barrel. The body portion of the socket embraces the body of the coupling $e$, leaving the outer end of the coupling exposed. The coupling is composed, preferably, of vulcanized rubber, and is provided with an air-passage $e'$. Said passage is preferably enlarged at its outer end, as shown at $e^2$, adapted to grasp and form an air-tight joint around the casing $f$ of a tire-valve.

It will be seen that the coupling $e$, embraced by the socket $d$ and supported at its inner end by the abutment $d^4$, is securely confined, so that it cannot wabble about loosely. Hence the operator is enabled to hold it in secure and air-tight engagement with the valve-casing while operating the pump, there being no liability of the displacement of the pump due to yielding of the coupling.

It will be observed that the socket $d$ is formed integral with the barrel $a$, the said barrel and socket being formed from a piece of tubing which is contracted at $d^3$ to form a shoulder $d^4$ as a support for the inner end of the coupling $e$. The socket $d$ is arranged at an obtuse angle with the barrel $a$, as shown in the drawings, this arrangement enabling the coupling $e$ to be conveniently applied to a valve which is between the spokes of a wheel, the valve occupying a substantially vertical position, while the barrel $a$ is inclined outwardly from the plane of the wheel.

It will be readily understood that since the tube is a single one, including the bent portion forming the socket $d$ and the annular contraction which provides the shoulder $d^4$, the flexible coupling entirely filling and abutting at its rear against said shoulder, the construction as a whole is simple and efficient. Moreover it is extremely durable and inexpensive, owing to the fact that no screw-thread connections are required.

I claim—

An inflating-pump comprising a barrel having a bent end forming a coupling-socket integral with and at an angle to the body of the barrel, the said barrel being annularly contracted between the socket and body portions whereby a shoulder is formed at the rear of the socket portion, a solid flexible coupling fitting said socket and supported at its base by said shoulder, said coupling having a passage constituting the air-outlet of the pump, and a plunger within the barrel of the pump.

In testimony whereof I have affixed my signature in presence of two witnesses.

HENRY K. AUSTIN.

Witnesses:
  C. F. BROWN,
  E. BATCHELDER.